US009082008B2

(12) United States Patent
Ma et al.

(10) Patent No.: US 9,082,008 B2
(45) Date of Patent: Jul. 14, 2015

(54) SYSTEM AND METHODS FOR FEATURE SELECTION AND MATCHING

(71) Applicant: Honeywell International Inc., Morristown, NJ (US)

(72) Inventors: Yunqian Ma, Plymouth, MN (US); Benjamin Mohr, St. Louis Park, MN (US); Christopher Jon Visker, Farmington, MN (US)

(73) Assignee: Honeywell International Inc., Morristown, NJ (US)

( * ) Notice: Subject to any disclaimer, the term of this patent is extended or adjusted under 35 U.S.C. 154(b) by 381 days.

(21) Appl. No.: 13/692,436

(22) Filed: Dec. 3, 2012

(65) Prior Publication Data
US 2014/0153788 A1 Jun. 5, 2014

(51) Int. Cl.
*G06K 9/00* (2006.01)
*G01C 21/00* (2006.01)
*G01C 21/16* (2006.01)
*G01C 21/36* (2006.01)
*G06T 7/00* (2006.01)

(52) U.S. Cl.
CPC .......... *G06K 9/00476* (2013.01); *G01C 21/005* (2013.01); *G01C 21/165* (2013.01); *G01C 21/3602* (2013.01); *G06K 9/00214* (2013.01); *G06K 9/00791* (2013.01); *G06T 7/0042* (2013.01); *G06T 2207/10028* (2013.01); *G06T 2207/30252* (2013.01)

(58) Field of Classification Search
None
See application file for complete search history.

(56) References Cited

U.S. PATENT DOCUMENTS

| 7,471,832 B2 | 12/2008 | Luo et al. | |
|---|---|---|---|
| 7,706,603 B2 * | 4/2010 | Najafi et al. | 382/154 |
| 8,001,115 B2 | 8/2011 | Davis et al. | |

(Continued)

FOREIGN PATENT DOCUMENTS

| EP | 2144038 | 1/2010 |
|---|---|---|
| EP | 2503510 | 9/2012 |

OTHER PUBLICATIONS

European Patent Office, "European Search Report from EP Application No. 13190969.9 mailed Mar. 28, 2014", "from Foreign Counterpart of U.S. Appl. No. 13/692,436", Mar. 28, 2014, pp. 1-3, Published in: EP.

(Continued)

*Primary Examiner* — Sumati Lefkowitz
*Assistant Examiner* — Carol Wang
(74) *Attorney, Agent, or Firm* — Fogg & Powers LLC

(57) ABSTRACT

Systems and methods for feature selection and matching are provided. In certain embodiments, a method for matching features comprises extracting a first plurality of features from current image data acquired from at least one sensor and extracting a second plurality of features from a prior map, wherein the prior map represents an environment containing the navigation system independently of data currently acquired by the at least one sensor. The method also comprises identifying at least one first feature in the first plurality of features and at least one second feature in the second plurality of features that have associated two-dimensional representations; and identifying at least one corresponding pair of features by comparing a three-dimensional representations of the at least one first feature to a three-dimensional representation of the at least one second feature.

20 Claims, 5 Drawing Sheets

(56) References Cited

U.S. PATENT DOCUMENTS

| | | | |
|---|---|---|---|
| 8,174,568 B2 | 5/2012 | Samarasekera et al. | |
| 2003/0012410 A1* | 1/2003 | Navab et al. | 382/103 |
| 2005/0069173 A1 | 3/2005 | Morisada et al. | |
| 2006/0012493 A1 | 1/2006 | Karlsson et al. | |
| 2006/0088203 A1 | 4/2006 | Boca et al. | |
| 2006/0204079 A1 | 9/2006 | Yamaguchi | |
| 2006/0221072 A1 | 10/2006 | Se et al. | |
| 2006/0235610 A1 | 10/2006 | Ariyur et al. | |
| 2009/0125223 A1 | 5/2009 | Higgins | |
| 2009/0185746 A1 | 7/2009 | Mian et al. | |
| 2009/0262206 A1 | 10/2009 | Park | |
| 2010/0097455 A1 | 4/2010 | Zhang et al. | |
| 2010/0100268 A1 | 4/2010 | Zhang et al. | |
| 2010/0305854 A1* | 12/2010 | Kammel et al. | 701/213 |
| 2011/0153206 A1 | 6/2011 | Kotaba et al. | |
| 2014/0309841 A1* | 10/2014 | Hara et al. | 701/26 |

OTHER PUBLICATIONS

U.S. Patent and Trademark Office, "Final Office Action", from U.S. Appl. No. 12/644,559, Mar. 25, 2014, pp. 1-15, Published in: US.

European Patent Office, "Office Action from EP Application No. 13190969.9 mailed Apr. 14, 2014", "from Foreign Counterpart of U.S. Appl. No. 13/692,436", Apr. 14, 2014, pp. 1-6, Published in: EP.

U.S. Patent and Trademark Office, "Advisory Action", "U.S. Appl. No. 12/644,559", Jun. 14, 2014, pp. 1-3.

U.S. Patent and Trademark Office, "Office Action", "U.S. Appl. No. 12/644,559", Oct. 2, 2014, pp. 1-29.

Wu et al., "3D Model Matching With Viewpoint-Invariant Patches (VIP)", "2008 IEEE Conference on Computer Vision and Patten Recognition", Jun. 23-28, 2008, pp. 1-8.

European Patent Office, "Office Action", "from Foreign Counterpart of U.S. Appl. No. 12/644,559", Aug. 5, 2011, pp. 1-5, Published in: EP.

European Patent Office, "European Search Report", "from Foreign Counterpart of U.S. Appl. No. 12/644,559", Apr. 15, 2011, pp. 1-4, Published in: EP.

U.S. Patent and Trademark Office, "Office Action", "U.S. Appl. No. 12/644,559", Sep. 25, 2012, pp. 1-18.

U.S. Patent and Trademark Office, "Restriction Requirement", "U.S. Appl. No. 12/644,559", Aug. 9, 2012, pp. 1-7.

Goshtasby et al., "Point Pattern Matching Using Convex Hull Edges", "IEEE Transctions on Systems, Man, and Cybernetics", Sep./Oct. 1985, pp. 631-637, vol. 15, No. 5.

R. Hartley, "In Defense of the Eight-Point Algorithm", "IEEE Transactions on Pattern Analysis and Machine Intelligence", Jun. 1997, pp. 580-593, vol. 19, No. 6, Publisher: IEEE.

Horn et al., "Closed-Form Solution of Absolute Orientation Using Unit Quaternions", "Journal of the Optical Society of America", Apr. 1987, pp. 629-642, vol. 4, Publisher: Optical Society of America.

Irschara et al., "From Structure-From-Motion Point Clouds to Fast Location Recognition", "IEEE Computer Society Conference on Computer Vision and Pattern Recognition", Apr. 18, 2009, pp. 1-8.

Jean et al., "Trajectories Normalization for Viewpoint Invariant Gait Recognition", Dec. 8, 2008, pp. 1-4, Publisher: IEEE.

Nister, "An Efficient Solution to the Five-Point Relative Pose Problem", "Pattern Analysis and Machine Intelligence", Jun. 2004, pp. 1-17, vol. 26, No. 6, Publisher: IEEE.

Rodrigo et al, "Robust and Efficient Feature Tracking for Indoor Navigation", "IEEE Transactions on Systems. Man.and Cybernetics—Part B: Cybernetics", Jun. 2009, pp. 658-671, vol. 39, No. 3, Publisher: IEEE.

Vedaldi et al., "On Viewpoint Invariance for Non-Planar Scenes", "UCLA CSD Technical Report #TR050012", Mar. 3, 2006, pp. 1-22.

U.S. Patent and Trademark Office, "Notice of Allowance", "from U.S. Appl. No. 12/644,559", Apr. 27, 2015, pp. 1-9, Published in: US.

* cited by examiner

SYSTEM AND METHODS FOR FEATURE SELECTION AND MATCHING

BACKGROUND

Certain image based navigation systems extract features from images acquired from an image sensor and match the features to a map representing the environment through which the navigation system travels. The image based navigation system estimates the vehicles position, velocity and attitude based on the matching of the features in the image to similar features within the map. Frequently, the a-priori map data and the image data represent an environment having many different identifiable features. In certain implementations, matching the many different identifiable features using a 2-D matching algorithm may lead to an incorrect feature match and degrade the navigation solution. Thus, a problem exists in how to perform 3-D feature extraction and matching that is not as computationally expensive while still maintaining accurate feature matching.

SUMMARY

Systems and methods for feature selection and matching are provided. In certain embodiments, a method for matching features comprises extracting a first plurality of features from current image data acquired from at least one sensor and extracting a second plurality of features from a prior map, wherein the prior map represents an environment containing the navigation system independently of data currently acquired by the at least one sensor. The method also comprises identifying at least one first feature in the first plurality of features and at least one second feature in the second plurality of features that have associated two-dimensional representations; and identifying at least one corresponding pair of features by comparing a three-dimensional representations of the at least one first feature to a three-dimensional representation of the at least one second feature.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
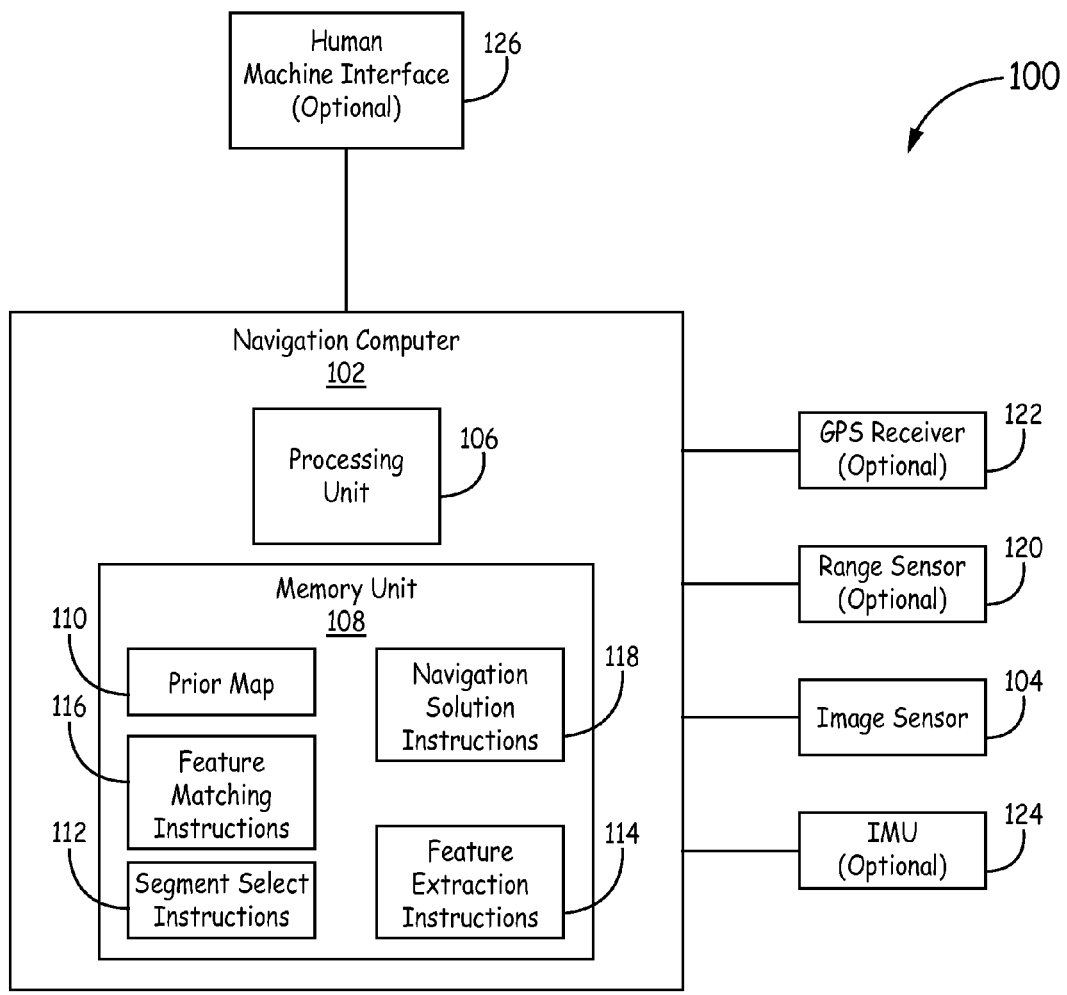
FIG. 1 is a block diagram of a navigation system in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present disclosure address systems and methods for feature selection and matching. Further, embodiments of the present disclosure are able to prune the amount of features considered for matching while still correctly determining that a particular feature in a previously created map corresponds to an extracted feature in an image. To ensure that a particular feature corresponds to an extracted feature, a navigation computer prunes the possible number of features being considered from all the possible features extracted from the image and the previously acquired map. To prune the number of features, the navigation computer selects a segment of the image and a segment of the map and then extracts features from the selected segments based loosely on the current navigation state. The navigation computer then extracts several features from the sensor image and the a-priori library image. The navigation computer then generates a descriptor for each extracted feature. This descriptor quantifies the change in pixel intensity from the extracted feature and its surrounding pixels. It then applies a two-dimensional association algorithm with the feature descriptors. From the extracted features, the navigation computer identifies a set of associated features based on the likelihood that different associated features correspond to one another. A feature from the sensor image corresponds to another feature from the a-priori library if the Euclidian distances between the feature's descriptor are minimized. From the set of associated features, the navigation computer uses three-dimensional information to generate a vertical descriptor for each feature. The three dimensional information for the feature area may be obtained from another sensor, such as a LADAR or RADAR, or by stereo vision techniques applied to multiple camera images. The Euclidian distance from the vertical descriptors are calculated in order to quantify how likely the associated features match. If matching features are identified, the navigation computer calculates the difference between the observed pixel locations from the image sensor and the expected pixel location based on the current navigational state. The navigation computer uses this pixel difference to form a correction term for the current navigation and updates the current state accordingly.

FIG. 1 is a block diagram illustrating a navigation system 100. The navigation system 100 exists on a vehicle or an individual that is traveling through an environment and functions to provide a navigation solution describing the motion of the vehicle or individual. In certain embodiments, the navigation solution describes at least one of the position, velocity, and attitude of the vehicle or individual. To determine the navigation solution, the navigation system 100 includes sensors that acquire information at particular moments in time, where the acquired information either describes the environment through which the navigation system 100 is travelling or the information describes the motion of the navigation system 100. The navigation system 100 uses this information to determine the navigation solution of the vehicle.

In at least one embodiment, the navigation system 100 uses at least one image sensor 104 to acquire information about the environment containing the navigation system 100. For example, image sensor 104 can include a single camera that acquires images of the environment. Alternatively, the image sensor 104 can include multiple cameras that are offset from one another in such a way that the multiple cameras can provide stereoscopic images from which three-dimensional data can be calculated. Within the navigation system 100, the image sensor 104 provides image data describing the environment containing the image sensor 104 to a navigation computer 102.

The navigation computer 102 is a computer that calculates the navigation solution for the navigation system 100 based on measurements received from the sensors and previously acquired data describing the environment. Navigation computer 102 includes a processing unit 106 and a memory unit 108. In at least one implementation, the processing unit 106 is a programmable device that processes data received from the image sensor as directed by instructions stored on the memory unit 108.

In certain embodiments, the memory unit 108 is an electronic hardware device for storing machine readable data and instructions. In one embodiment, memory unit 108 stores information on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAM-BUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In certain embodiments, to use data from image sensor 104 to calculate a navigation solution, the memory unit 108 stores multiple executable instructions thereon. For example, memory unit 108 stores segment select instructions 112, feature extraction instructions 114, feature matching instructions 116, and navigation solution instructions 118. Also, in certain embodiments, the memory unit 108 stores data that facilitates the calculation of navigation solutions, such as a prior map 110, where the prior map 110 includes data that represents a portion of the environment containing the navigation system 100 independently of data that is currently acquired from the image sensor 104. For example, in one implementation, the prior map is constructed from information acquired through previous measurements by image sensor 104 or other sensors. In alternative embodiments, the prior map 110 is a terrain database that models the environment that is created independently from any measurements from the image sensor 104. For example, the prior map 110 can be a database storing digital terrain elevation data (DTED) or other type of database.

In certain embodiments, the prior map 110 and the image data provided by the image sensor 104 can contain many identifiable features that could provide potential corresponding features. For example, an airplane that flies high above the earth can capture an image containing hundreds, if not thousands, of features. The extraction of all of the possible features from image data containing a large number of possible features could be computationally intensive to the extent that the navigation computer 102 would be unable to identify the features in a reasonable time to provide an accurate navigation solution. To limit the number of possible features considered within an image or prior map 110, the processing unit 106 executes segment select instructions 112. The segment select instructions 112 direct processing unit 106 to divide an image or map into separate segments or tiles, where each segment describes a contiguous region in the image or map that corresponds to a particular region in an environment. The processing unit 106, executing segment select instructions 112, then uses previously calculated navigational information to select a segment of image data or map data upon which to perform feature matching or extraction. By selecting a particular segment in the image data or in the prior map 110 that contains fewer features, the processing unit 106 is able to process the image data for feature extraction and matching within a shorter time period than if all the features from both the image data and the prior map 110 were processed.

When segments from the image data and the prior map 110 are selected, the processing unit 106 executes the feature extraction instructions 114. The feature extraction instructions 114 direct processing unit 106 to perform methods for extracting features from image data such as the image data acquired by image sensor 104 or the image data in the prior map 110. For example, the processing unit 106 extracts features from image data using any of multiple feature extraction algorithms known to one having skill in the art. For example, the processing unit 106 is able to extract features using a scale-invariant feature transform (SIFT) extraction algorithm, a speed-up robust feature (SURF) extraction algorithm, a Kanade Lucas Tomasi (KLT) extraction algorithm, and the like. Likewise, features can be extracted from the prior map 110 using similar methods employed to extract features from the image data. Alternatively, the prior map 110 may include a database of features from which the features associated with a particular region in the map can be selected. When features are extracted from the image data acquired by the image sensor 104 and extracted from the prior map 110, the processing unit 106 can correlate the extracted features from the image data with the extracted features in the prior map 110 to calculate a navigation solution.

To determine which features extracted from the image data correspond with certain identified features in the prior map 110, the processing unit 106 executes feature matching instructions 116. The feature matching instructions 114 direct the processing unit 106 to identify the corresponding features between the extracted features from the image data and the identified features in the prior map 110. In at least one embodiment, feature matching instructions 116 direct the processing unit 106 to perform a two step process. In the first step of the process, the processing unit 106 finds a set of associated features in two dimensions from the image data according to the feature descriptions provided by the feature extraction algorithm implemented through feature extraction instructions 114. When a set of associated features is found in two dimensions, the processing unit 106 proceeds to the second step by comparing the set of associated features against one another in three dimensions (from LADAR, RADAR, stereo image, or other 3-D data) to determine which features in the set of associated features correspond with one another, where three dimensional data is acquired through a LADAR, RADAR, stereo imagery, and the like. In certain implementations, the processing unit 106 compares the different associations in the set of associated features by comparing three-dimensional histograms for the area surrounding the identified features. For example, the processing unit 106 creates histograms based on the elevation of the area surrounding the identified features. Features in the set of associated features that provide the most similar three-dimensional histograms are determined to be corresponding features. This technique allows further pruning of potential feature matches, allowing features which have the same 2-D (image contrast) descriptor but different 3-D (elevation) descriptors to be discarded. Without the additional 3-D comparison, an incorrect match could possibly be identified.

When corresponding features have been identified, processing unit 106 executes navigation solution instructions 118. Navigation solution instructions 118 direct the processing unit 106 to calculate updates for the navigation solution calculated by the navigation computer 102. In at least one implementation, when corresponding features have been identified, the processing unit 106 calculates the difference between a feature location in the image acquired by the image sensor 104 and a predicted location of the feature based on the three-dimensional location of the feature stored in the prior map 110 and the estimated navigation solution. The processing unit 106 uses the difference to update and improve the navigation solution through the use of a Kalman filter.

In certain implementations, the navigation system 100 includes sensors other than the image sensor 104. For example, the navigation system 100 may include a range sensor 120. When the navigation system 100 includes a range sensor 120, the range sensor 120 can aid the image sensor 104 in providing three-dimensional image data that describes the environment of the navigation system 100. In at least one implementation, the range sensor 120 includes a LiDAR, a radar, an electronic distance meter, and the like. In a further alternative embodiment, the navigation system 100 may include other sensors that provide navigational data to the navigation computer 102. For example, the navigation computer 102 may receive inertial measurement data from an inertial measurement unit 124. As one having skill in the art would recognize, the inertial measurement unit 124 provides inertial measurements associated with acceleration and rotation as measured by multiple accelerometers and gyroscopes. Further, the navigation computer 102 may receive measurements from a global positioning system (GPS) receiver 122. The navigation solution instructions 118 direct the processing unit 106 to use the additional navigation information from the additional sensors to calculate a navigation solution for the navigation system 100. In certain implementations, when the navigation solution is calculated, the navigation computer provides the navigation solution to a human machine interface 126, where the human machine interface 126 can provide information derived from the calculated navigation solution to a user. In at least one implementation, the human machine interface 126 includes a display for displaying the information, a speaker for providing audio information, and/or an input device such as a keyboard, pointer, touch screen, etc. that allow the user to input information.

Figure 2:
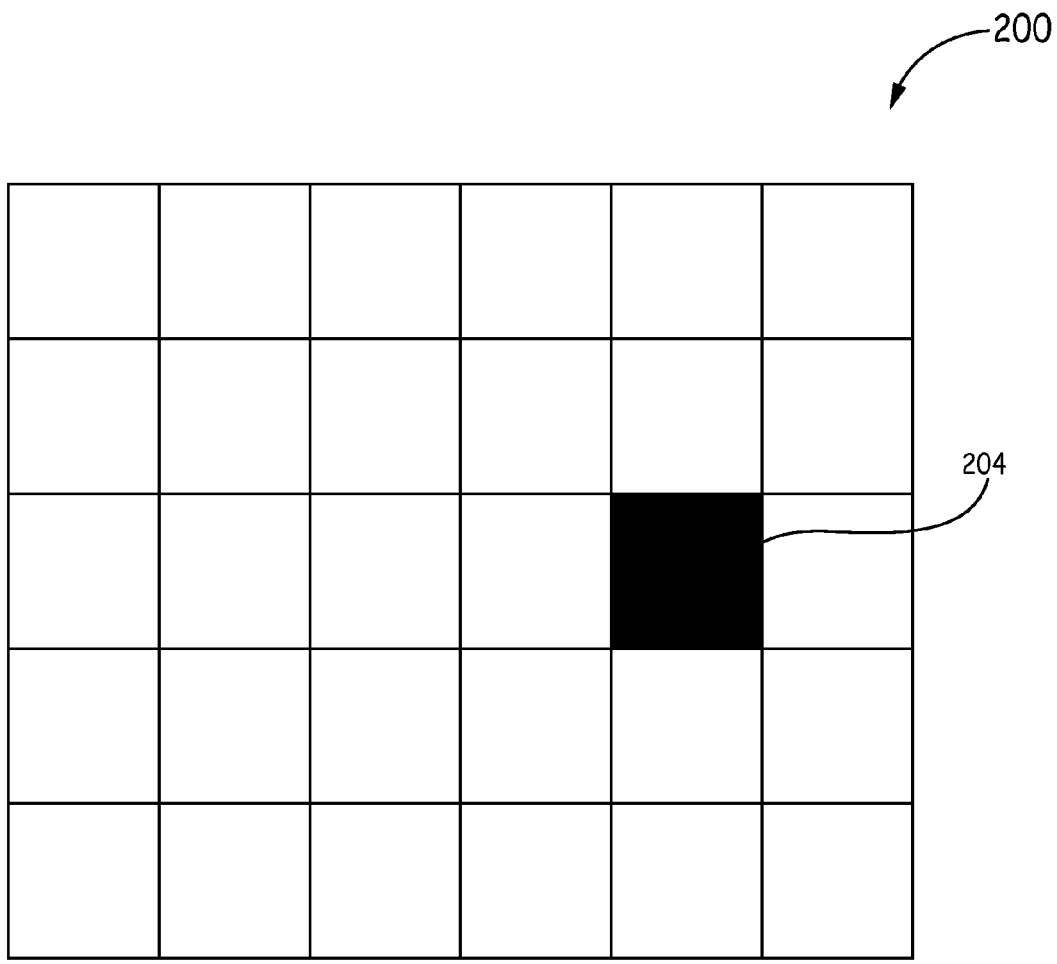
FIG. 2 is a diagram illustrating segmentation of an image and selection of a segment within the image according to at least one embodiment described in the present disclosure.

FIG. 2 is a block diagram illustrating the processing of image data 200 by the processing unit 106 as it executes the segment select instructions 112 in FIG. 1. Frequently, when the processing unit 106 receives image data 200 from an image sensor such as image sensor 104 in FIG. 1, the image data 200 describes enough features that the processing of all the identifiable features described by the image data 200 would pose a significant burden to the processing unit 106. When there are too many features described by the image data 200, the processing unit 106 may become unable to satisfactorily process the image data 200 within a time constraint. For example, an airplane may acquire image data 200 associated with multiple miles of the surface of the earth and there may be many features within the image data. Similarly, the prior map 110 may also contain many identifiable features. The processing unit 106 may be unable to process the large number of features described by the image data 200 acquired by the airplane and the number of images in the prior map 110 during the time period needed to provide an update to a navigation solution. To limit the number of features processed by the processing unit 106, the segment select instructions 112 direct the processing unit 106 to divide the image data 200 into separate segments. For example, as illustrated in FIG. 2, the image data 200 is divided into thirty different segments. As shown in FIG. 2, the different segments are rectangular and equal in size to one another. Alternatively, the segments can be of different shapes and sizes in relation to one another. Further, in at least one implementation the processing unit 106 segments both the image data 200 and the prior map 110 to have a different number of tiles. For example, the processing unit 106 may segment the image data 200 acquired by the image sensor 104 into 16 segments and data from the prior map 110 into 24 segments. In at least one implementation, the prior map 110 and the image data 200 are segmented such that the segments from both the prior map 110 and the image data 200 are the same size in respect to the environment containing the navigation system 100.

In certain embodiments, when the image data 200 and the prior map 110 are segmented, the segment select instructions 112 direct the processing unit 106 to select a segment from the image data 200 and a segment from the prior map 110 for further processing. For example, as shown in FIG. 2, the processing unit 106, upon executing segment select instructions 112, selects segment 204 in the image data 200 for further processing. To select the segment for future processing the processing unit 106 uses previously calculated navigation data to estimate the current location of the navigating vehicle. Based on the estimate of the current location, the processing unit 106 selects the segments in both the image data from the image sensor 104 and the prior map 110 that are most closely associated with the estimated current location of the navigation system 100. For example, when the navigation system is an airplane or other high flying vehicle, the image data 200 can represent a large area of the ground. To limit the space searched in the image data for features, the processing unit 106 selects a segment 204 from image data 200 that is closely associated with the estimated current location for the navigation system 100 by using the pose of the navigation system to estimate what segments are in the field of view of the image sensor 104. In an alternative embodiment, the processing unit 106 randomly selects segments in the image data 200 and the prior map 110 that are associated with one another. For example, the processing unit 106 selects the segment 204 and then identifies the segment in the prior map 110 that is associated with the segment 204.

Figure 3:
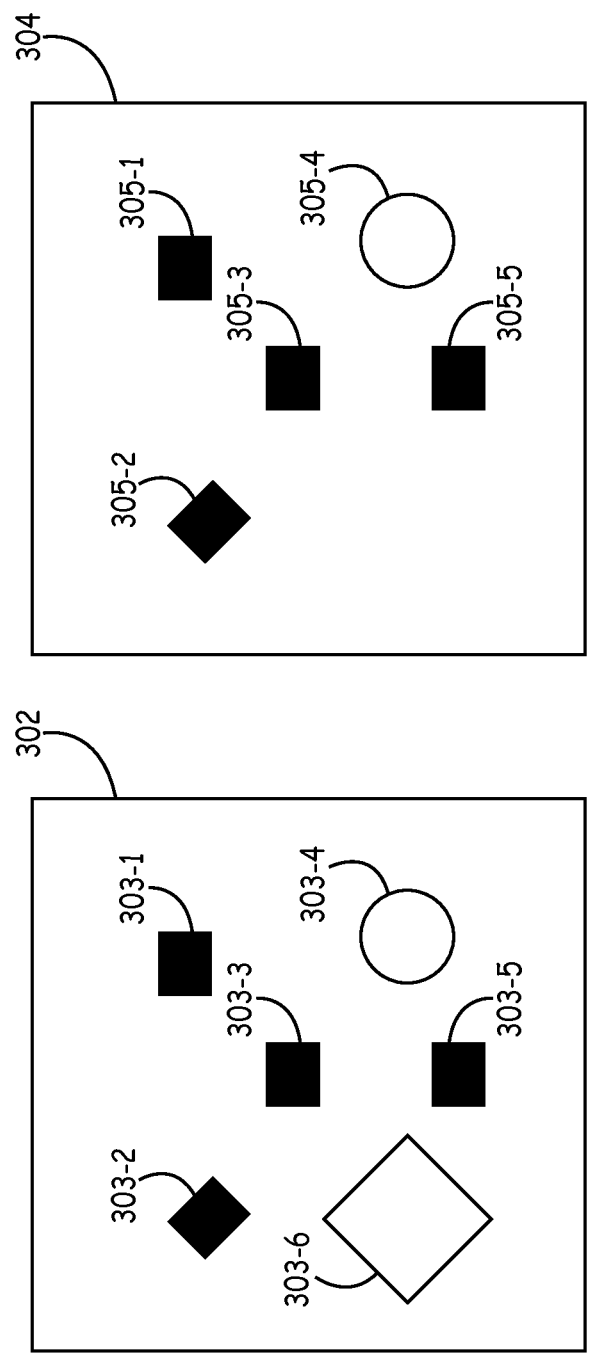
FIG. 3 is a diagram illustrating the extraction of features according to at least one embodiment described in the present disclosure.

As described above, when segments are selected from both the image data 200 acquired by the image sensor 104 and the prior map 110, the feature extractions instructions 114 direct the processing unit to extract the features from the selected image data segment 204 and the features from the selected prior map segment. FIG. 3 illustrates an image data segment 302 and a prior map segment 304 selected by the segment select instructions 112. The feature extraction instructions 114 direct the processing unit 106 to identify the features as described above using a feature extraction algorithm such as SIFT, SURF, KLT, and the like. For instance, a SIFT feature is a point feature, which, in certain environments, may correspond to a building corner. Further, the SIFT feature also a represents a small neighborhood around the point feature. For example, when the processing unit 106 extracts features from the image data segment 302, the processing unit 106 identifies features 303-1-303-6. Likewise, when the processing unit 106 extracts features from the prior map segment 304, the processing unit 106 identifies features 305-1-305-5. In certain embodiments, when the processing unit 106 extracts a feature, the processing unit 106 calculates quantifiable identifiers for the different extracted features. For example, when performing the SIFT algorithm, the processing unit calculates a unique descriptor for each extracted feature. Further, the quantifiable identifier can describe characteristics of the feature such as vectors normal to a planar surface of the vector, edge descriptions, and the like.

When the processing unit 106 has extracted the features 303-1-303-6 from the image data segment 302 and features 305-1-305-5 from the prior map segment 304, the feature matching instructions 116 directs the processing unit 106 to perform a two-dimensional association of features 303-1-303-6 against features 305-1-305-5 according to quantifiable identifiers calculated by the processing unit 106. In at least one embodiment, when the processing unit 106 associates features in different images, the processing unit 106 identifies a set of possible matches for a feature. Further, the processing unit 106 orders the associations according to the likelihood that features in the association correspond to one another. For example, if a corresponding features has been found in consecutive frames of image data, the processing unit 106 may have a high certainty that the subsequent associations of the feature correspond to one another. Further, if features extracted from both the image data and the prior map 110 have similar quantifiable identifiers, the features with similar quantifiable identifiers can also have a higher certainty that the features correspond to one another. In at least one exemplary implementation, in FIG. 3, the processing unit 106 determines that feature 303-1 in the image data segment 302 are associated with features 305-1, 305-3, and 305-5 in the prior map segment 304. Further, the processing unit 106 determines that the order of likelihood that feature 303-1 corresponds to features in the prior map segment 304 are 305-1, 305-3, and 305-5.

Figure 4:
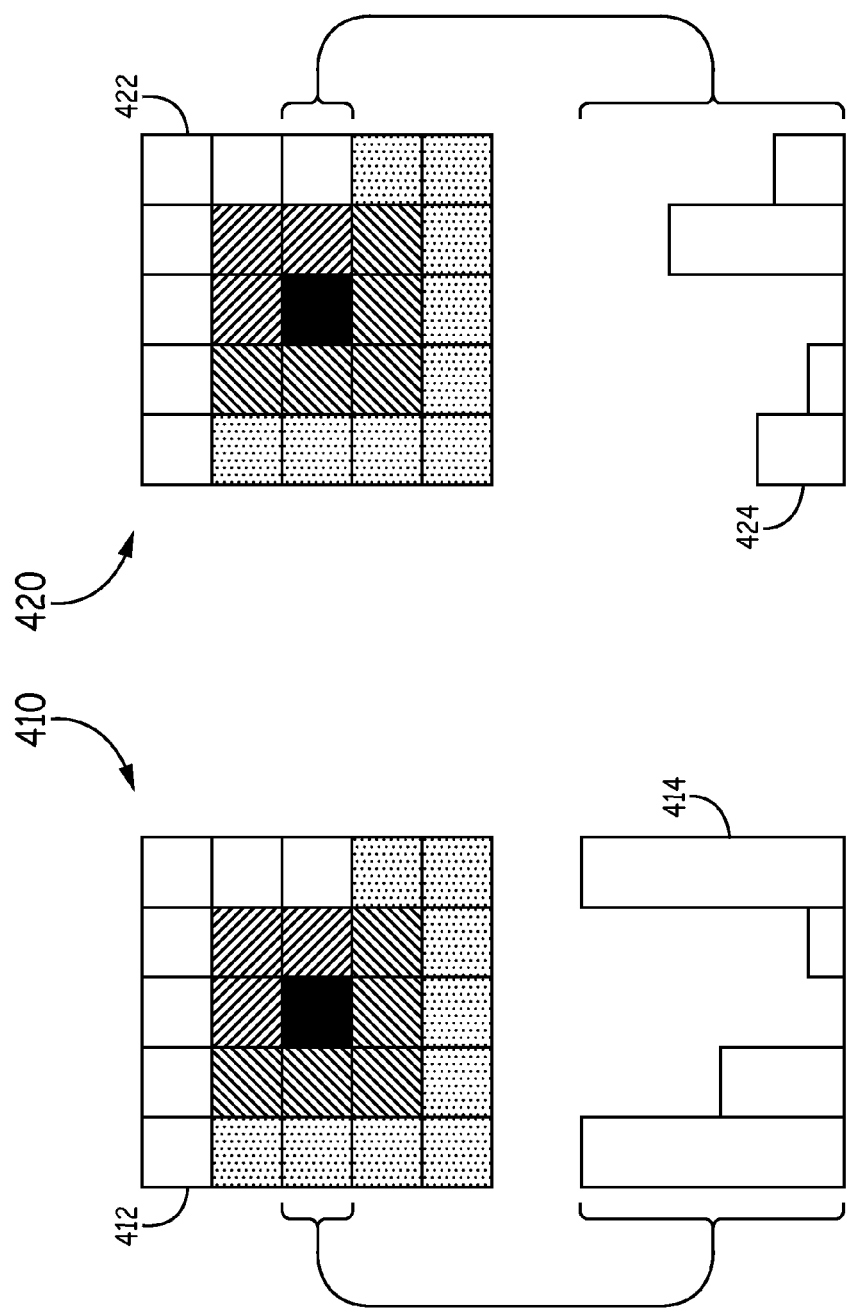
FIG. 4 is a diagram illustrating the association of different features according to at least one embodiment described in the present disclosure.

When the processing unit 106 has found a set of associated features for the features in the image data segment 302 and the prior map segment 304 and ordered the set of associated features according to the likelihood that features correspond to one another, the feature matching instructions 116 direct the processing unit 106 to perform a three-dimensional matching on the features in the set of associated features. FIG. 4 illustrates one exemplary embodiment for performing a three-dimensional matching of features using three-dimensional histograms, where the three-dimensional histograms represent altitude and/or elevation information. As illustrated, FIG. 4 illustrates first feature data 410 and second feature data 420. Both first feature data 410 and second feature data 420 were identified by the feature matching instructions 116 as being associated with a feature identified in the prior map 110. Conversely, first feature data 410 and second feature data 420 are identified in the prior map 110 as associated with a feature identified in the image data acquired from the image sensor 104. As shown in FIG. 4, each of the first feature data 410 and the second feature data 420 may be represented by a two dimensional grid. For example, the first feature data 410 is represented by a first feature two dimensional grid 412 and the second feature data 420 is represented by a second feature two dimensional grid 422. As shown in FIG. 4, both the first feature two-dimensional grid 412 and the second feature two-dimensional grid 422 appear to contain the same information. In certain environments, two-dimensional representations of different features may appear the same. For example, when an image is acquired by a vehicle high above the earth, a tower and a black rock may appear the same in the two dimensional representation. To distinguish different features that appear similar in two-dimensions, the feature matching instructions 116 direct the processing unit 106 to compare three-dimensional representations of the different features to further distinguish the different features from one another, where the three-dimensional representations include altitude and/or elevation information.

In certain embodiments, the feature matching instructions 116 direct the processing unit 106 to create a three-dimensional histogram to facilitate the comparison of different features in three dimensions. As shown in FIG. 4, the first feature data 410 having the first feature two-dimensional grid 412 can be represented with a first feature three-dimensional histogram 414. Likewise, the second feature data 420 having the second feature two-dimensional grid 422 can be represented with a second feature three-dimensional histogram 424. In certain implementations, to represent the two dimensional feature as a histogram, the processing unit 116 creates a three-dimensional grid that corresponds to the two-dimensional image representation of the feature, where each square of the two-dimensional representation has an associated elevation or altitude. In some implementations, the square is associated with a pixel, a group of pixels, or a particular sized area of the environment represented by the image data. In at least one embodiment, a feature can be represented by a 5 by 5 grid in a two dimensional image representation and the feature can be represented by a 5 by 5 by 10 grid in a three dimensional representation. To create the three-dimensional grid, the processing unit 106 uses altitude information from the prior map 110 for features extracted from the prior map 110 and the processing unit 106 uses three-dimensional information acquired by an image sensor 104, altimeter, or range sensor for features extracted from image data.

In at least one exemplary embodiment, when a feature is represented through a histogram, the height of the pixels in the third dimension is determined by the difference in elevation or altitude between the center pixel and the surrounding pixel. For example, the first feature three-dimensional histogram 414 shows a cross section of a single row of the three-dimensional histogram representation. As is illustrated in FIG. 4, the first feature three-dimensional histogram 414 has a different altitude difference in the environment surrounding the feature when compared to the second feature three-dimensional histogram 424. The feature matching instructions 116 instruct the processing unit 106 to identify corresponding features in the image data and the prior map 110 by identifying associated features that have the most similar three-dimensional histograms. In at least one embodiment, to determine whether the first feature three-dimensional histogram is similar to the second feature three-dimensional histogram, the first feature three-dimensional histograms is correlated with the second feature three-dimensional histogram. Alternatively, similarity of three-dimensional histograms can be determined by the number of matching pixels, the average difference in altitude for each pixel, and the like. The three-dimensional histograms provide another check to ensure that a feature identified in image data acquired from an image sensor 104 corresponds to a feature extracted from a prior map 110.

Figure 5:
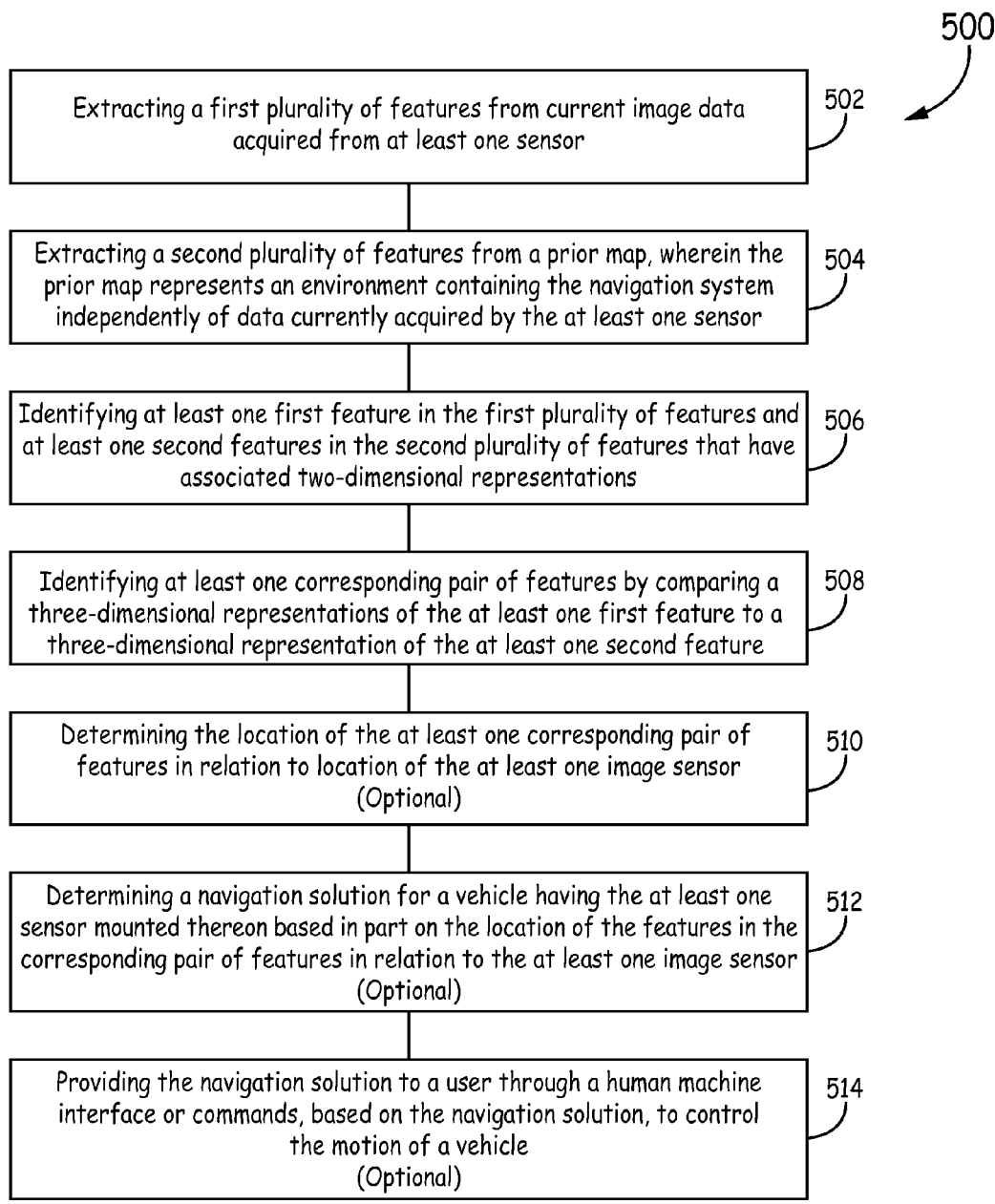
FIG. 5 is a flow diagram of a method for feature selection and identification of corresponding features according to at least one embodiment described in the present disclosure.

FIG. 5 is a flow diagram illustrating a method 500 for identifying corresponding features extracted from image and extracted from a prior map. Method 500 proceeds at 502 where a first plurality of features is extracted from current image data acquired from at least one sensor. Method 500 proceeds at 504 where a second plurality of features is extracted from a prior map, wherein the prior map represents an environment containing the navigation system independently of data currently acquired by the at least one sensor. For example, a navigation system extracts features from the prior map and the image data using a feature extraction algorithm. Further, in at least one embodiment, both the prior map and the image data are segmented to reduce the area of the prior map and the image data from which features are extracted.

Method 500 proceeds at 506, where at least one first feature in the first plurality of features and at least one second feature in the second plurality of features is identified that have associated two-dimensional representations. Method 500 proceeds to 508, where at least one corresponding pair of features is identified by comparing a three-dimensional representation of the at least one first feature to a three-dimensional representation of the at least one second feature. The navigation system associates features in the extracted features from the image data and the prior map in two dimensions to acquire a set of associated features. The navigation system then identifies corresponding features in the set of associated features to increase the certainty that the corresponding features correspond to the same feature in the environment containing the navigation system.

In certain optional embodiments, the method 500 proceeds at 510, where the location of the at least one corresponding pair of features is identified in relation to the location of the at least one image sensor. Method 500 proceeds to 512 where a navigation solution is determined for a vehicle having the at least one sensor mounted thereon based in part on the location of the features in the corresponding pair of features in relation to the at least one image sensor. When a navigation solution is either calculated or updated, the method 500 proceeds to 514, where the navigation solution is provided to a user through a human machine interface or commands are provided, based on the navigation solution, to control the motion of a vehicle.

Example Embodiments

Example 1 includes a navigation system, the system comprising: at least one sensor configured to acquire a three-dimensional representation of the environment containing the navigation system; a memory unit configured to store executable instructions and a prior map of the environment, wherein the prior map represents the environment containing the navigation system independently of data currently acquired by the at least one sensor; and a processing unit configured to execute the executable instructions, wherein the executable instructions direct the processing unit to: extract a first plurality of features from current image data; extract a second plurality of features from the prior map; compare two-dimensional representations of the first plurality of features to two-dimensional representations of the second plurality of features to find at least one first feature in the first plurality of features that associate with at least one second feature in the second plurality of features; and compare a three-dimensional representations of the at least one first feature to a three-dimensional representation of the at least one second feature to identify at least one corresponding pair of features.

Example 2 includes the navigation system of Example 1, wherein the processing unit is further configured to: divide the current image data into a plurality of image data segments; divide the prior map into a plurality of map segments; select an image data segment from the plurality of image data segments and a map segment from the plurality of map segments; and extract the first plurality of features from the image data segment and the second plurality of features from the map segment.

Example 3 includes the navigation system of Example 2, wherein the processing unit selects the image data segment and the map segment based on an estimated position of the navigation system within the environment.

Example 4 includes the navigation system of any of Examples 1-3, wherein the at least one first feature is a first set of features and the at least one second feature is a second set of features, wherein an image feature in the first set of features is associated with at least one map feature in the second set of features and the associated features are ordered according to a likelihood of corresponding to one another.

Example 5 includes the navigation system of any of Examples 1-4, wherein the prior map is a database storing terrain information of the environment.

Example 6 includes the navigation system of any of Examples 1-5, wherein the three-dimensional representation is a three-dimensional histogram.

Example 7 includes the navigation system of Example 6, wherein the three-dimensional histogram is centered on data associated with the location of a feature.

Example 8 includes the navigation system of any of Examples 6-7, wherein the three-dimensional histogram illustrates the position of a feature and neighboring environment along the surface of the terrain and the difference between the elevation of a surface of the feature and the surface of the neighboring environment.

Example 9 includes the navigation system of any of Examples 1-8, wherein features are extracted using at least one of: a scale-invariant feature transform extraction method; a speeded up robust features extraction method; and a Kanade Lucas Tomasi feature extraction method.

Example 10 includes the navigation system of any of Examples 1-9, wherein two-dimensional representations of features are associated with one another according to feature identifiers calculated when the features were extracted.

Example 11 includes the navigation system of any of Examples 1-10, wherein the processing unit is further configured to identify a navigation solution for the navigation system based in part on the location of the features in the matched pair of features in relation to the navigation system.

Example 12 includes a method for matching features, the method comprising: extracting a first plurality of features from current image data acquired from at least one sensor; extracting a second plurality of features from a prior map, wherein the prior map represents an environment containing the navigation system independently of data currently acquired by the at least one sensor; identifying at least one first feature in the first plurality of features and at least one second feature in the second plurality of features that have associated two-dimensional representations; and identifying at least one corresponding pair of features by comparing a three-dimensional representations of the at least one first feature to a three-dimensional representation of the at least one second feature.

Example 13 includes the method of Example 12, further comprising: determining the location of the at least one corresponding pair of features in relation to the location of the at least one image sensor; and determining a navigation solution for a vehicle having the at least one sensor mounted thereon based in part on the location of the features in the corresponding pair of features in relation to the at least one image sensor; and providing at least one of the navigation solution to a user through a human machine interface and commands based on the navigation solution to control the motion of a vehicle.

Example 14 includes the method of any of Examples 12-13, further comprising: dividing the current image data into a plurality of image data segments; dividing the prior map into a plurality of map segments; selecting an image data segment from the plurality of image data segments and a map segment from the plurality of map segments; and extracting the first plurality of features from the image data segment and the second plurality of features from the map segment.

Example 15 includes the method of any of Examples 12-14, wherein the at least one first feature is a first set of features and the at least one second feature is a second set of features, wherein an image features in the first set of features is associated with at least one map feature in the second set of features and the associated features are ordered according to a likelihood of corresponding to one another.

Example 16 includes the method of any of Examples 12-15, wherein the prior map is a database storing terrain information of the environment.

Example 17 includes the method of any of Examples 12-16, wherein the three-dimensional representation is a three-dimensional histogram.

Example 18 includes the method of any of Examples 12-17, wherein the three-dimensional histogram is centered on data associated with the location of a feature.

Example 19 includes a program product for identifying corresponding features, the program product comprising a plurality of instructions tangibly stored on a non-transitory storage medium, the instructions operable, when executed, to cause a processing unit to: extract a first plurality of features from current image data acquired from at least one sensor configured to acquire a three-dimensional representation of an environment containing the at least one sensor; extract a second plurality of features from a prior map of the environment, wherein the prior map represents the environment independently of data currently acquired by the at least one sensor; identify at least one first feature in the first plurality of features and at least one second feature in the second plurality of features that have associated two-dimensional representations; and identify at least one corresponding pair of features by comparing a three-dimensional histogram of the at least one first feature to a three-dimensional histogram of the at least one second feature.

Example 20 includes the program product of Example 19, wherein the instruction are further operable to cause the processing unit to calculate a navigation solution for a vehicle having the at least one sensor mounted thereon, wherein the calculation is based in part on the location of the features in the at least one corresponding pair of features in relation to the vehicle.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A navigation system, the system comprising:
    at least one sensor configured to acquire a three-dimensional representation of the environment containing the navigation system;
    a memory unit configured to store executable instructions and a prior map of the environment, wherein the prior map represents the environment containing the navigation system independently of data currently acquired by the at least one sensor; and
    a processing unit configured to execute the executable instructions, wherein the executable instructions direct the processing unit to:
    extract a first plurality of features from current image data;
    extract a second plurality of features from the prior map;
    compare two-dimensional representations of the first plurality of features to two-dimensional representations of the second plurality of features to find at least one first feature in the first plurality of features that associate with at least one second feature in the second plurality of features; and
    compare a three-dimensional representation of the at least one first feature to a three-dimensional representation of the at least one second feature to identify at least one corresponding pair of features.

2. The navigation system of claim 1, wherein the processing unit is further configured to:
    divide the current image data into a plurality of image data segments;
    divide the prior map into a plurality of map segments;
    select an image data segment from the plurality of image data segments and a map segment from the plurality of map segments; and
    extract the first plurality of features from the image data segment and the second plurality of features from the map segment.

3. The navigation system of claim 2, wherein the processing unit selects the image data segment and the map segment based on an estimated position of the navigation system within the environment.

4. The navigation system of claim 1, wherein the at least one first feature is a first set of features and the at least one second feature is a second set of features, wherein an image feature in the first set of features is associated with at least one map feature in the second set of features and the associated features are ordered according to a likelihood of corresponding to one another.

5. The navigation system of claim 1, wherein the prior map is a database storing terrain information of the environment.

6. The navigation system of claim 1, wherein the three-dimensional representation of the at least one first feature and the three-dimensional representation of the at least one second feature are three-dimensional histograms.

7. The navigation system of claim 6, wherein the three-dimensional histograms are centered on data associated with the location of a feature.

8. The navigation system of claim 6, wherein the three-dimensional histograms illustrate the position of a feature and neighboring environment along the surface of the terrain and the difference between the elevation of a surface of the feature and the surface of the neighboring environment.

9. The navigation system of claim 1, wherein features are extracted using at least one of:
    a scale-invariant feature transform extraction method;
    a speeded up robust features extraction method; and
    a Kanade Lucas Tomasi feature extraction method.

10. The navigation system of claim 1, wherein two-dimensional representations of features are associated with one another according to feature identifiers calculated when the features were extracted.

11. The navigation system of claim 1, wherein the processing unit is further configured to identify a navigation solution for the navigation system based in part on the location of the features in the matched pair of features in relation to the navigation system.

12. A method for matching features, the method comprising:
- extracting a first plurality of features from current image data acquired from at least one sensor;
- extracting a second plurality of features from a prior map, wherein the prior map represents an environment containing the navigation system independently of data currently acquired by the at least one sensor;
- identifying at least one first feature in the first plurality of features and at least one second feature in the second plurality of features that have associated two-dimensional representations;
- and identifying at least one corresponding pair of features by comparing a three-dimensional representation of the at least one first feature to a three-dimensional representation of the at least one second feature.

13. The method of claim 12, further comprising:
- determining the location of the at least one corresponding pair of features in relation to the location of the at least one image sensor; and
- determining a navigation solution for a vehicle having the at least one sensor mounted thereon based in part on the location of the features in the corresponding pair of features in relation to the at least one image sensor; and
- providing at least one of the navigation solution to a user through a human machine interface and commands based on the navigation solution to control the motion of a vehicle.

14. The method of claim 12, further comprising:
- dividing the current image data into a plurality of image data segments;
- dividing the prior map into a plurality of map segments;
- selecting an image data segment from the plurality of image data segments and a map segment from the plurality of map segments; and
- extracting the first plurality of features from the image data segment and the second plurality of features from the map segment.

15. The method of claim 12, wherein the at least one first feature is a first set of features and the at least one second feature is a second set of features, wherein an image features in the first set of features is associated with at least one map feature in the second set of features and the associated features are ordered according to a likelihood of corresponding to one another.

16. The method of claim 12, wherein the prior map is a database storing terrain information of the environment.

17. The method of claim 12, wherein the three-dimensional representation of the at least one first feature and the three-dimensional representation of the at least one second feature are three-dimensional histograms.

18. The method of claim 17, wherein the three-dimensional histograms are centered on data associated with the location of a feature.

19. A program product for identifying corresponding features, the program product comprising a plurality of instructions tangibly stored on a non-transitory storage medium, the instructions operable, when executed, to cause a processing unit to:
- extract a first plurality of features from current image data acquired from at least one sensor configured to acquire a three-dimensional representation of an environment containing the at least one sensor;
- extract a second plurality of features from a prior map of the environment, wherein the prior map represents the environment independently of data currently acquired by the at least one sensor;
- identify at least one first feature in the first plurality of features and at least one second feature in the second plurality of features that have associated two-dimensional representations; and
- identify at least one corresponding pair of features by comparing a three-dimensional histogram of the at least one first feature to a three-dimensional histogram of the at least one second feature.

20. The program product of claim 19, wherein the instruction are further operable to cause the processing unit to calculate a navigation solution for a vehicle having the at least one sensor mounted thereon, wherein the calculation is based in part on the location of the features in the at least one corresponding pair of features in relation to the vehicle.

* * * * *